United States Patent
Tao et al.

(10) Patent No.: US 8,144,657 B2
(45) Date of Patent: Mar. 27, 2012

(54) CLUSTERING BASED RESOURCE ALLOCATION IN MULTI-CELL OFDMA NETWORKS

(75) Inventors: Zhifeng Tao, Allston, MA (US); Weihuang Fu, Cincinnati, OH (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 510 days.

(21) Appl. No.: 12/393,820

(22) Filed: Feb. 26, 2009

(65) Prior Publication Data

US 2010/0214997 A1    Aug. 26, 2010

(51) Int. Cl.
*H04Q 7/00* (2006.01)
(52) U.S. Cl. .......................................... 370/329; 370/338
(58) Field of Classification Search .................. 370/252, 370/328, 329, 338, 401, 465
See application file for complete search history.

(56) References Cited

U.S. PATENT DOCUMENTS

| | | | |
|---|---|---|---|
| 5,590,398 A * | 12/1996 | Matthews | 455/433 |
| 7,508,792 B2 * | 3/2009 | Petrovic et al. | 370/331 |
| 7,676,230 B2 * | 3/2010 | Kang et al. | 455/450 |
| 7,782,807 B2 * | 8/2010 | Yoon et al. | 370/312 |
| 7,796,997 B2 * | 9/2010 | Kim et al. | 455/450 |
| 2008/0146231 A1 * | 6/2008 | Huang et al. | 455/436 |
| 2008/0232320 A1 * | 9/2008 | Lee et al. | 370/329 |
| 2008/0248803 A1 * | 10/2008 | Lee et al. | 455/450 |
| 2008/0261607 A1 * | 10/2008 | Craig | 455/450 |
| 2009/0042512 A1 * | 2/2009 | Haseba et al. | 455/63.1 |
| 2009/0262696 A1 * | 10/2009 | Wei et al. | 370/329 |
| 2009/0264142 A1 * | 10/2009 | Sankar et al. | 455/501 |
| 2010/0124930 A1 * | 5/2010 | Andrews et al. | 455/436 |

* cited by examiner

*Primary Examiner* — Ricky Ngo
*Assistant Examiner* — Christine Ng
(74) *Attorney, Agent, or Firm* — Dirk Brinkman; Gene Vinokur

(57) ABSTRACT

A method allocates resource in an Orthogonal Frequency-Division Multiple Access (OFDMA) network, including a set of Base Stations (BSs) and a set of Mobile Stations (MSs) for each BS. OFDMA frame are constructed as multiple resource blocks, and each resource block contains symbols transmitted on different subcarriers. A cluster is formed from adjacent sectors of different neighboring cells to jointly optimize the resource allocation in multiple frames, and three non-overlap zones are sequentially identified in cluster: cell center zone, cell edge zone, and cluster corner zone. Resource allocation includes intra-cluster proportional fair scheduling and inter-cluster interference mitigation. Intra-cluster scheduling further includes resource allocation for cell center zone and resource allocation for cell edge zone.

9 Claims, 9 Drawing Sheets

CLUSTERING BASED RESOURCE ALLOCATION IN MULTI-CELL OFDMA NETWORKS

FIELD OF INVENTION

This invention related generally to resource allocation in wireless networks, and more particularly to resource allocation in Orthogonal Frequency Division Multiple Access cellular networks using a clustering based resource allocation.

BACKGROUND OF THE INVENTION

OFDMA

Orthogonal frequency-division multiplexing (OFDM) is a modulation technique used at the physical layer (PHY) of a number of wireless networks, e.g., networks designed according to the well known IEEE 802.11a/g and IEEE 802.16/16e standards. Orthogonal Frequency-Division Multiple Access (OFDMA) is a multiple access scheme based on OFDM. In OFDMA, separate sets of orthogonal tones (sub-channels) and time slots are allocated to multiple transceivers (users or mobile stations) so that the transceivers can communicate concurrently. OFDMA is widely adopted in many next generation cellular networks such as 3GPP Long Term Evolution (LTE) and IEEE 802.16m due to its effectiveness and flexibility in radio resource allocation.

OFDMA Resource Allocation

The radio spectrum is a scarce resource in wireless communications, and therefore an efficient use of it is needed. The rapid growth of wireless applications and subscriber users have called for a good radio resource management (RRM) scheme that can increase the network capacity and, from a commercial point of view, save deployment cost. Consequently, developing an effective radio resource allocation scheme for OFDMA is of significant interest for industry.

The fundamental challenge in resource allocation is the inequality between the scarce spectrum that is available, and the vast area to be covered and large number of users to be served. In other words, the same frequency spectrum must be reused in multiple geographical areas or cells. This will inevitably incur inter-cell interference (ICI), when users or mobile stations (MSs) in neighboring cells use the same spectrum. In fact, ICI has been shown to be the predominant performance-limiting factor for wireless cellular networks. As a result, a significant amount of research has been devoted to developing ICI-aware radio resource allocation for cellular networks.

SUMMARY OF THE INVENTION

The embodiments of the invention provide a multi-cell OFDMA downlink resource allocation method using clustering based resource allocation. This method differs from the prior art in five fundamental aspects.

Firstly, the allocation of resource block is cluster based instead of cell based. Each cell in the network is partitioned into three sectors where each sector has a directional antenna or antenna array to serve the mobile stations in the sector. A cluster is formed by neighboring sectors of neighboring cells. In general, a cluster is formed by three neighboring sectors of neighboring cells. The reason behind this cluster formation is that the inter-cell interference is most serious in the intersection of neighboring cells. By jointly allocating resource in the formed cluster, the inter-cell interference can be effectively avoided or reduced, which improves performance as compared to the cell based resource allocation.

Secondly, inter-cluster interference is reduced by fractional resource block reuse. The resource allocations of clusters are also mutually affected as in the cell based resource allocation, but the effect is less. In the cell based resource allocation, the inter-cell interference is mostly at the cell edge zone. But the inter-cluster interference is mostly at the cluster corner zone, which is much less than that of the cell edge zone. To reduce the inter-cluster interference, clustering based resource allocation implements fractional resource block reuse for the corner zones so the intra-cluster allocation can focus on the interference reduction in the neighboring sectors without considering about the mutually inter-cluster interference.

Thirdly, to fairly perform intra-cluster resource block allocation, the scheme in this invention implements proportional fair scheduler, which means each mobile station has a proportional data rate. Different to a scheduler to maximize the overall data rate, the proportional fair scheduler enables the mobile stations with a bad channel condition to have similar data rate as those having good channel condition. Also, different to a scheduler considering fair number of resource blocks, the proportional scheduler takes the modulation and coding rate into consideration, and provides a proportional fair in data rate.

Fourthly, the base station is able to adjust the transmit powers and fractionally reuse the resource blocks regarding the zones of mobile stations. The base station uses a lower transmit power for the cell center zone to reduce the interference in the cluster. The resource blocks can be reused at most three times in the cluster for the mobile stations in the center zones. The base station uses higher transmit power for the mobile stations in the edge zones to enhance the Signal Interference Noise Ratio (SINR). This portion of resource blocks is only utilized once in a cluster. Therefore, the resource block has different reuse factors according to the allocation of zones in a cluster.

Fifth, the relative geographical locations of mobile stations are identified by the diversity sets of mobile stations. Because the fractional resource block reuse and transmit power rely on the relative location of mobile stations, it is important for each base station to acknowledge the zones of mobile stations. It is natural and correct to use diversity set for this method to identify the zone location of mobile stations. Using diversity set has a much lower overhead as compared to conventional receiving signal strength indicator (RSSI) method.

The method includes the following steps:
Cluster formation;
Channel state information collection;
Intra-cluster proportional fair scheduling by resource allocation for cell center zone and resource allocation for cell edge zone; and
Resource allocation for inter-cluster interference mitigation.

In the first step, clusters are formulated in an OFDMA network. Because a cell is divided into three sectors, the management of resource at a base station can be separated into three independent units for three sectors. Each sector has an antenna or antenna array to serve the mobile stations in the sector. In general, the cluster is formed by three neighboring sectors of three neighboring cells. For those cells at the edge of the network, which do not have three neighboring cells, the cluster is formed by one or two sectors, depending on the number of neighboring sectors.

For the sectors in the cluster, the resource management of the sector is performed for the cluster, and not by the base station. For the base station involved in three different clusters, the three sectors resource management is associated with three different clusters. Every cluster has a cluster head in charge of the resource management and allocation for the cluster. Clusters are formed at the initiation of the network. The clusters are updated when the base station availability is changed.

For example, when a new base station joins the network, clusters are formed for the new base station. If the base station leaves the network, clusters are also formed. It is noted that the forming of clusters is distributed. It happens at the sectors near the area where base station changes. The cluster head can be located on any base station of a cluster, depending on the condition of the network infrastructure (backhaul network), or the ability of base station. Cluster located at the edge have a reduced size.

In the second step, in cluster coverage, the mobile station senses the channel state using pilot blocks and reports the Channel State Information (CSI) to its serving base station through an uplink transmission. The base stations then report the information to the cluster head using the backhaul network. If the cluster head is located on certain base station, then that base station can acquire the information directly, without sending the information over the backhaul network. The backhaul network has very high speed wired or dedicated connection, and the information collection only happens in neighboring base stations. So, the CSI collection at a cluster head is able to be done very quickly.

In the third step, intra-cluster resource allocation is performed for the mobile station in the cell center and cell edge zones of cluster. Three frames from three sectors jointly form a frame array. The resource block, which is usually logically denoted by a square in a resource map, is now denoted by a logical cube in three dimensional space.

The prior resource block identified by the pair (f, t) in a frame, is now indexed by a triplet (f, t, s), where f denotes the subcarrier index, t denotes symbol index, and s denotes the sector index. Clustering based resource allocation improves performance mainly by the following factors. The allocation reuses the resource blocks at the three center zones of a cluster to enhance throughput. The allocation also reduces the inter-cell interference for the mobile stations at the cell edge zone by fractionally allocating resource blocks. During the downlink resource allocation, proportional fair scheduling is utilized to provide similar transmit data rate for mobile stations. For a mobile station, the modulation and coding rate is determined by the channel state information acquired during the second step. When considering the allocation of a resource block, besides the allocation constraints for interference mitigation and resource block reuse, the mobile user, which has low data rate, has a higher priority. Therefore, all mobile stations in a cluster have similar data rate.

In the fourth step, resource allocation for inter-cluster interference mitigation is performed for the mobile station located at the cluster corner zone. The cluster corner zone is the area at the corner of cluster where interference from base stations of different clusters tends to be the highest. The resource allocation for this zone is based on fractional resource block reuse allocation, which means the resource block is only reused for the sectors with defined reuse distance. The corner zones are located at the intersection of three neighboring clusters, where the most serious inter-cluster interference occurs. By fractional resource block reuse, the same resource block is only reused by other cluster at the reuse distance.

The clusters are formed at the initiation of the network, and maintained by monitoring the availability of base stations in the network. For each downlink frame, the second, third and fourth steps are repeated for the resource allocation.

DETAILED DESCRIPTION OF THE PREFERRED EMBODIMENTS

Clustering Based OFDMA Resource Block Allocation

Figure 1:
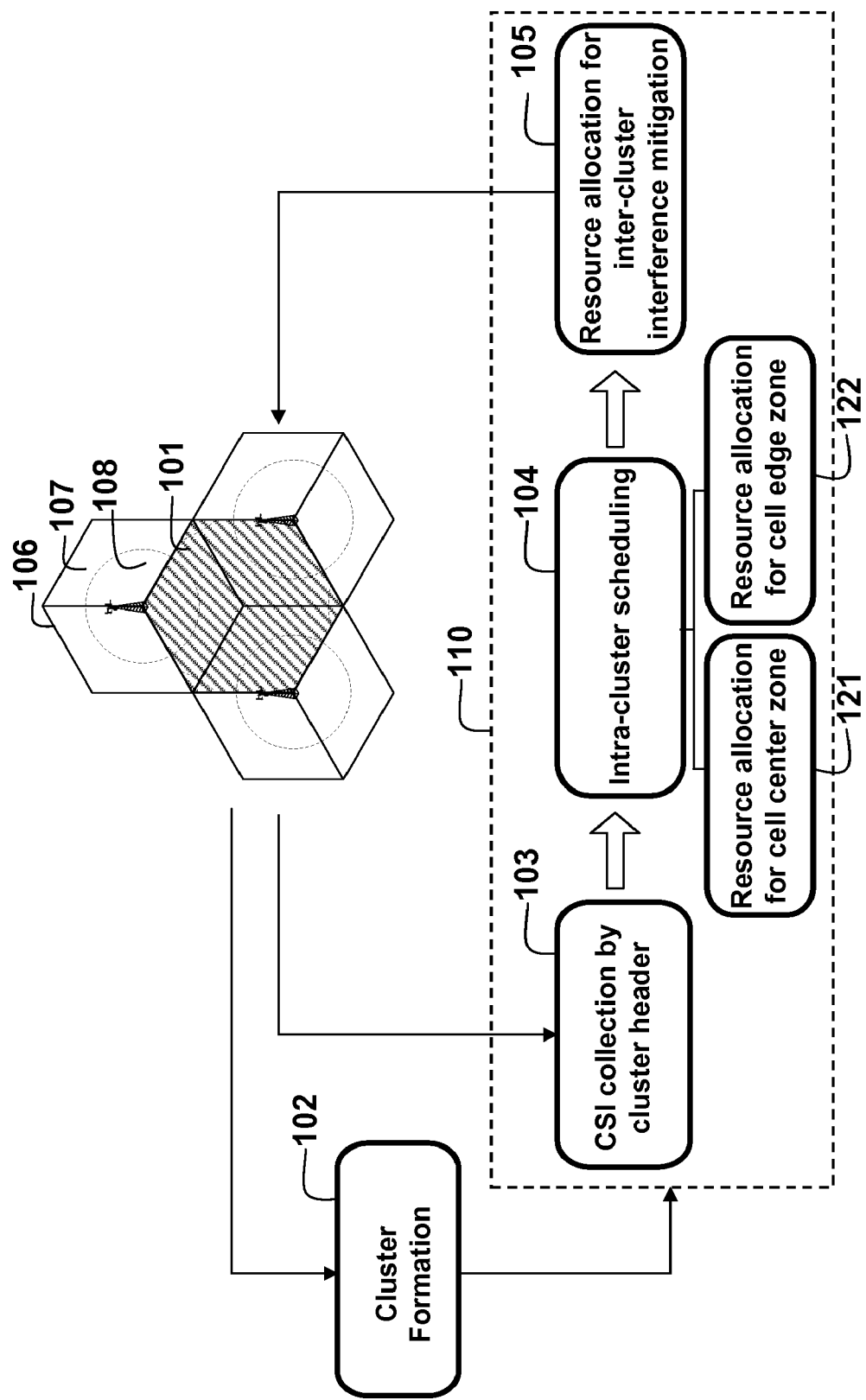
FIG. 1 is a flow chart of a method for clustering based resource block allocation in a multi-cell OFDMA network according to the embodiments of the invention.

FIG. 1 shows a method for resource allocation to mobile stations in an Orthogonal Frequency-Division Multiplexing Access (OFDMA) network according to embodiments of our invention. The OFDMA network includes a set of Base Stations (BSs), and each BS is associated with a set of Mobile Stations (MSs) in the cell served by the BS.

Cluster 101 is formed by the cluster formation process 102. Cluster formation occurs at the initiation of an OFDMA network, and subsequently when the network changes as BSs enter and leave the network.

Each cell 106 is partitioned into three sectors 107. Each base station 108 has three sets of antennas or antenna arrays to serve the three sectors, respectively. Because the inter-cell interference is more serious where sectors from neighboring cells abut, the adjacent sectors are jointed to form a cluster, shown cross-hatched in the figure. A typical cluster involves three base stations which support the information collection and resource allocation execution at their corresponding sectors. It is understood, that depending on the relative location of the BSs in the network geographic topology and antenna arrangements, other configurations of cells, base stations, sectors and clusters are possible. We use a hexagon to approximate the cell shape.

A cluster head 110 is formed after cluster formation. The cluster head can be locates at any base station in the cluster. The cluster head performs the following functions: channel state information collection 103, intra-cluster scheduling 104, and resource allocation for inter-cluster interference reduction 105. The scheduling effectively is allocating a time, which also a valuable network resource.

Intra-cluster scheduling can further include resource allocation for cell center zone 121, and resource allocation for cell edge zone 122. The functions are performed sequentially, and repeated for every frame period.

Cluster Formation

Figure 2:
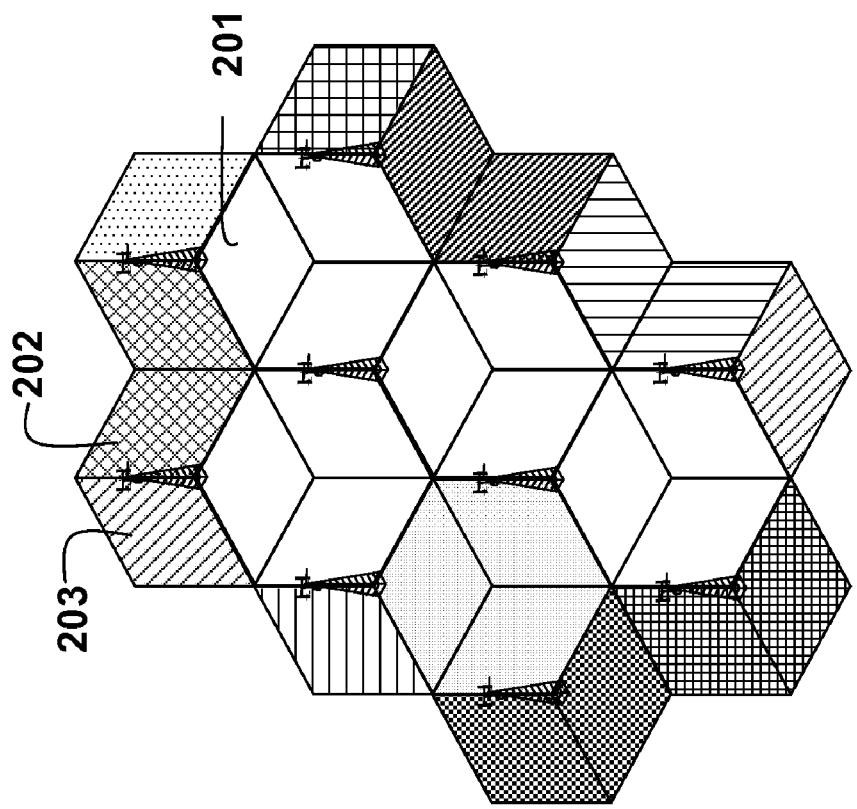
FIG. 2 is a schematic of formed clusters in a multi-cell network according to the embodiments of the invention.
Figure 2:
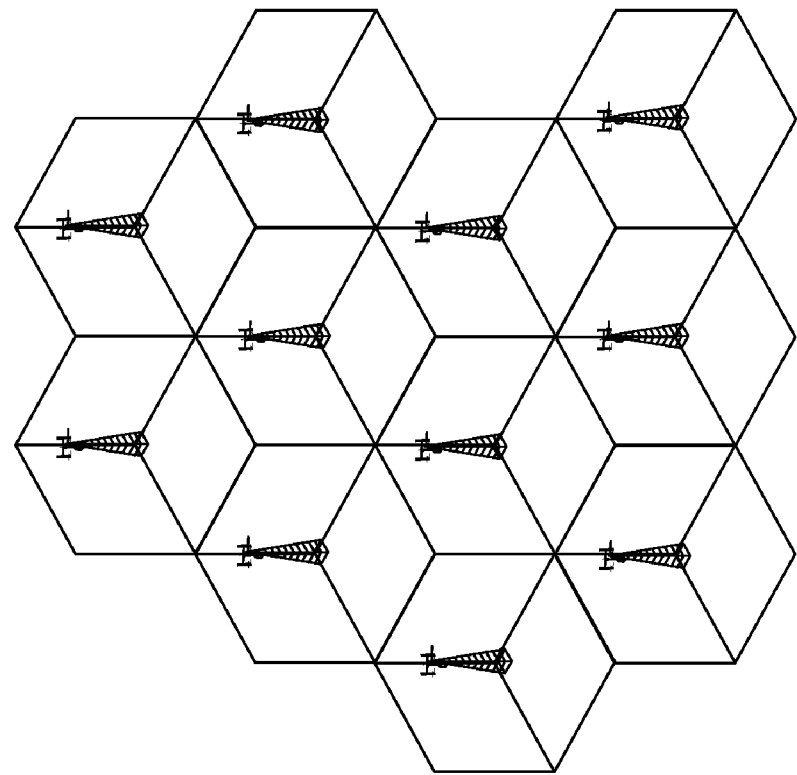

FIG. 2 shows sectors before and after clustering 210. Sectors in the same cluster have the same hatching pattern. A cluster 201 is formed by three adjacent sectors from three different base stations. Some clusters 202 on the boundary region of the network are formed by two sectors, because only two sectors are adjacent. Some clusters 203 only have one sector. For a cluster having only one sector, it does not have to exchange cluster information through the backhaul network 350, see FIG. 3, such as the cluster having more than one sector. In general, we take the cluster having three sectors as a general cluster in the network for the purpose of this description. The clusters on the boundary are a special case. The methods described herein are equally applicable to these smaller clusters.

Zone Division

Figure 3:
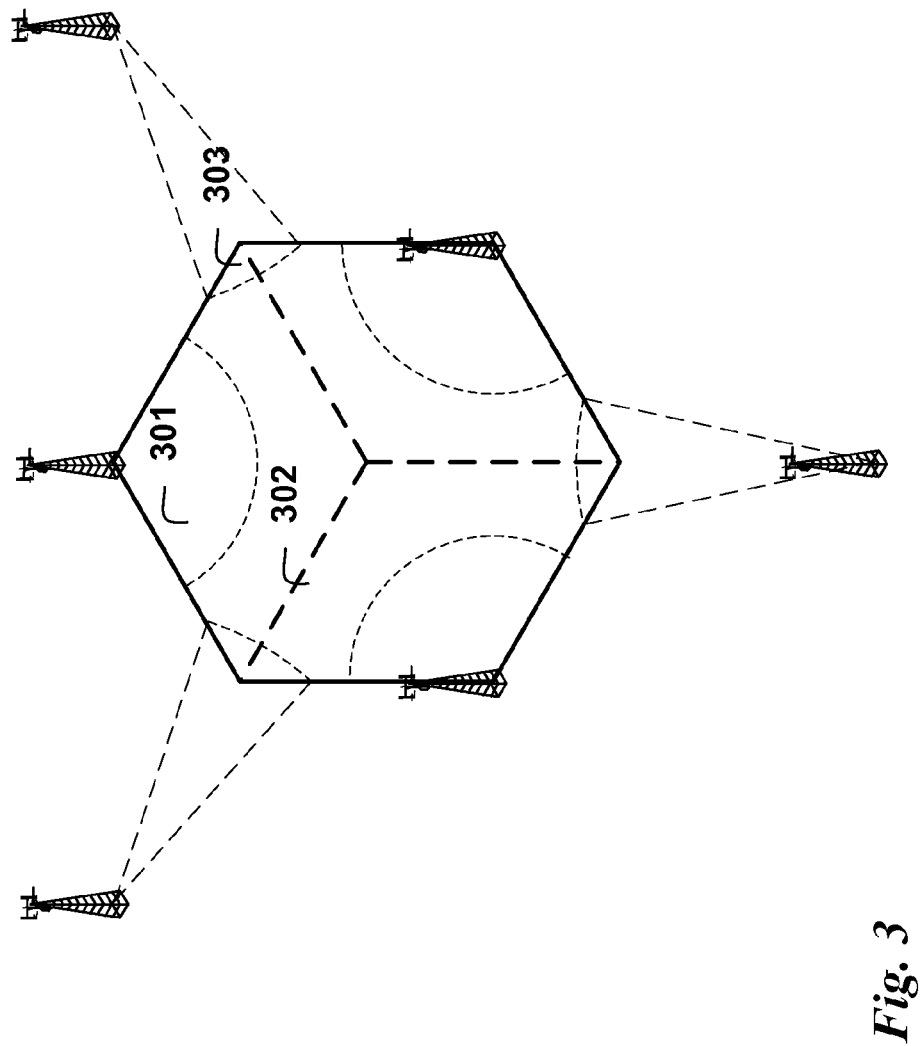
FIG. 3 is a schematic of a formed cluster and the region of cell center, cell edge, and cluster corner zones according to the embodiments of the invention.

FIG. 3 shows the zones in a cluster. The cell center zone 301 is closest to the base station of cell. The mobile station in the cell center zone have a low signal attenuation due to close distance to the serving base station, and low interference due to long distance to other interfering base stations. The cell edge zone 302 is at the intersection of coverage of the base stations. Because the coverages of two neighboring base stations overlap at the cell edge, cell edge zones are subject to interference. In addition, the signal attenuation also much higher than that in the cell center zone. So, we need certain measure to reduce the interference at this region. We define this region as the cell edge zone.

After cluster formation, a cluster has a corner zone 303 that is subject to high interference from base stations of neighboring clusters. In this zone, the distance to the base stations in the cluster is similar to the distance to nearest base station of the neighboring cluster. This zone has the most serious interference, and the weakest signal.

Resource allocation to mobile stations is according to these zones.

The determination of the zone of mobile station depends on its diversity set. If the diversity set only has one identification (ID) of the serving base station, this indicates that the mobile station is in the cell center zone. If the diversity set has two base station IDs, this indicates the mobile station is in the cell edge zone. If the diversity set has three base station IDs and three base stations are included in the cluster, this indicates the mobile station in the cell edge zones. More specifically, it is located at the intersection of three sectors. If the diversity set has three base station IDs, and any of them is not in the cluster, this indicates that the mobile station is at the cluster corner zone.

Power Allocation

Figure 4:
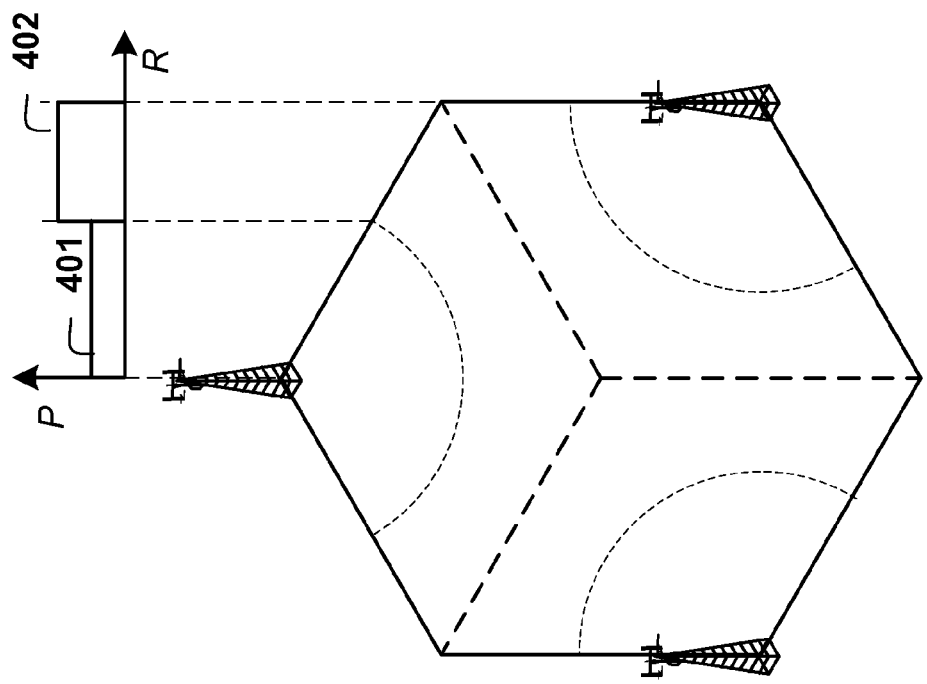
FIG. 4 is a schematic of sector power allocation based on the zones according to the embodiments of the invention.

FIG. 4 shows the power allocation in cluster. They are two power levels used by base station for downlink transmission: $P_c$ 401 and $P_e$ 402. Because the same resource block is shared by three base station at the cell center zone in a cluster, the allocation uses a lower transmit power $P_c$ 401.

For the mobile stations located in the cell edge zone and the corner zone, which are farther from the serving base station and more serious potential interference from base stations of neighboring clusters. These MSs are allocated the transmit power $P_e$ 402 to enhance signal power to overcome the interference from other clusters.

Resource Cubes in Cluster

Figure 5:
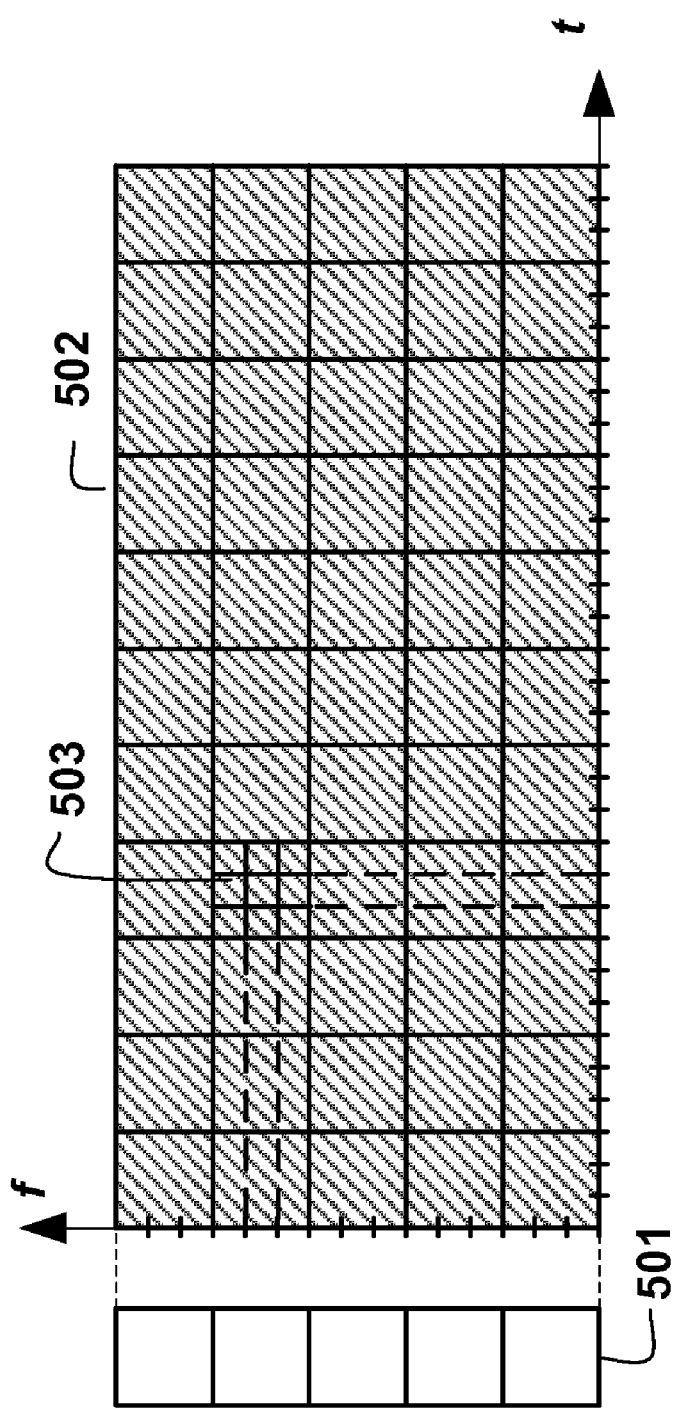
FIG. 5 is a schematic of a frame downlink data resource block structure of base station sector.

FIG. 5 shows a downlink frame 501. Because some resource blocks in the frame can serve for control messages and other purposes, we focus on the data resource blocks that are available for allocation. Data resource blocks available for allocation are shown by shaded region 502. Resource block 503 is to denote the basic unit in a frame for resource allocation. Each resource block contains a number of subcarriers in the frequency dimension, and OFDMA symbols in the time dimension.

The number of subcarriers contained by a resource block is denoted by integer $N_{scr}$ and the number of OFDMA symbols contained by a resource block is denoted by integer $N_{sym}$. Smaller values makes the allocation more flexibility, but takes more time. The values can be determined by the network. Our method can be used for various $N_{scr}$ and $N_{sym}$ values. Mobile station can be allocated by certain number of resource blocks. Certain number of mobile stations can have transmission during a downlink frame, while they are allocated resource blocks. Resource block is identified by (f, t) in a two dimensional plane, where index f takes $N_{scr}$ as unit, and the value is taken from $\{1, 2, \ldots, M_{scr}\}$, and similarly t takes $N_{sym}$ as unit, and the value is taken from $\{1, 2, \ldots, M_{sym}\}$.

Figure 6:
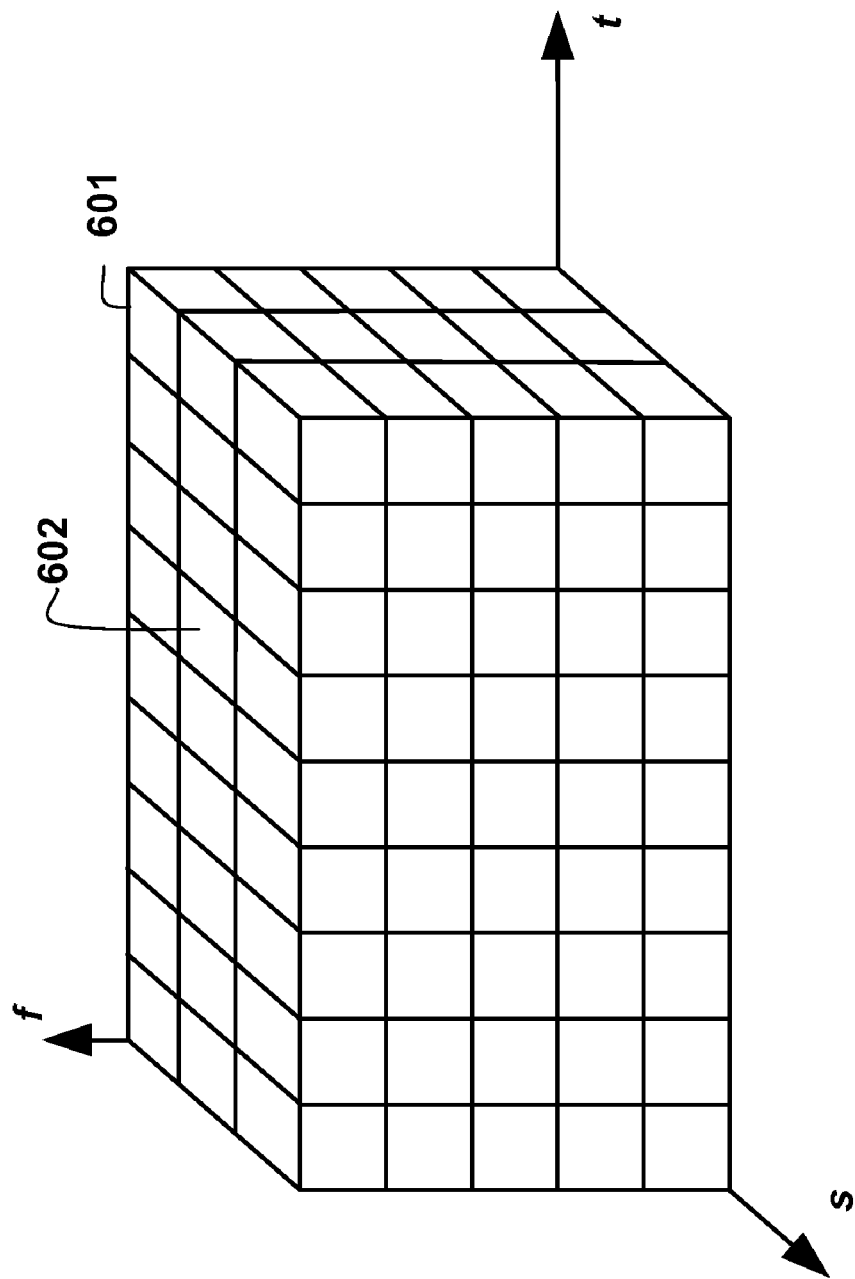
FIG. 6 is a schematic of clustering based frame resource blocks formed by three downlink frames according to the embodiments of the invention.

FIG. 6 shows the resource allocation space formed by data resource blocks from three downlink frames in cluster. The downlink can only have one or two frames if the cluster is located on the boundary of the network. Resource block is denoted by cube 601, and identified by frequency, time and space (f, t, s) in three dimensional space, where s is taken value from the set $\{1, 2, 3\}$. We call the three resource cubes identified by same f and t as resource cuboid. Thus, the resource cuboid is located by (f, t) and the resource cube comprising the cuboid is identified by s.

Proportional Fair Scheduler in Cluster

The resource allocation is based on the proportional fair scheduler. The selection metric for mobile station u is $$\rho_u = \frac{mr_u}{R_u},$$

where m is the number of resource blocks allocated to mobile station u in current frame, $r_u$ is the data rate that is used according to the channel state information obtained by the cluster head, and $R_u$ is the data rate of the previous frames.

To allocate the resource blocks available in FIG. 6 for the mobile stations in the cluster, the scheduler scans the resource cuboids in sequence of $\{1, 2, \ldots, k, \ldots, M_{RB}\}$, where $M_{RB}$ is less than $M_{scr} \times M_{sym}$, because certain resource blocks are reserved for the cluster corner resource allocation. The corresponding f and t are: f=(k−1 mod $M_{scr}$)+1 and t=$\lceil k/M_{scr} \rceil$.

The scheduler selects the mobile station with the minimum metric ρ from all mobile stations in the cell center and cell edge zones to allocate the resource. There are two cases: resource allocation for cell center zone and resource allocation for cell edge zone.

Resource Allocation for Cell Center Zone

Figure 7:
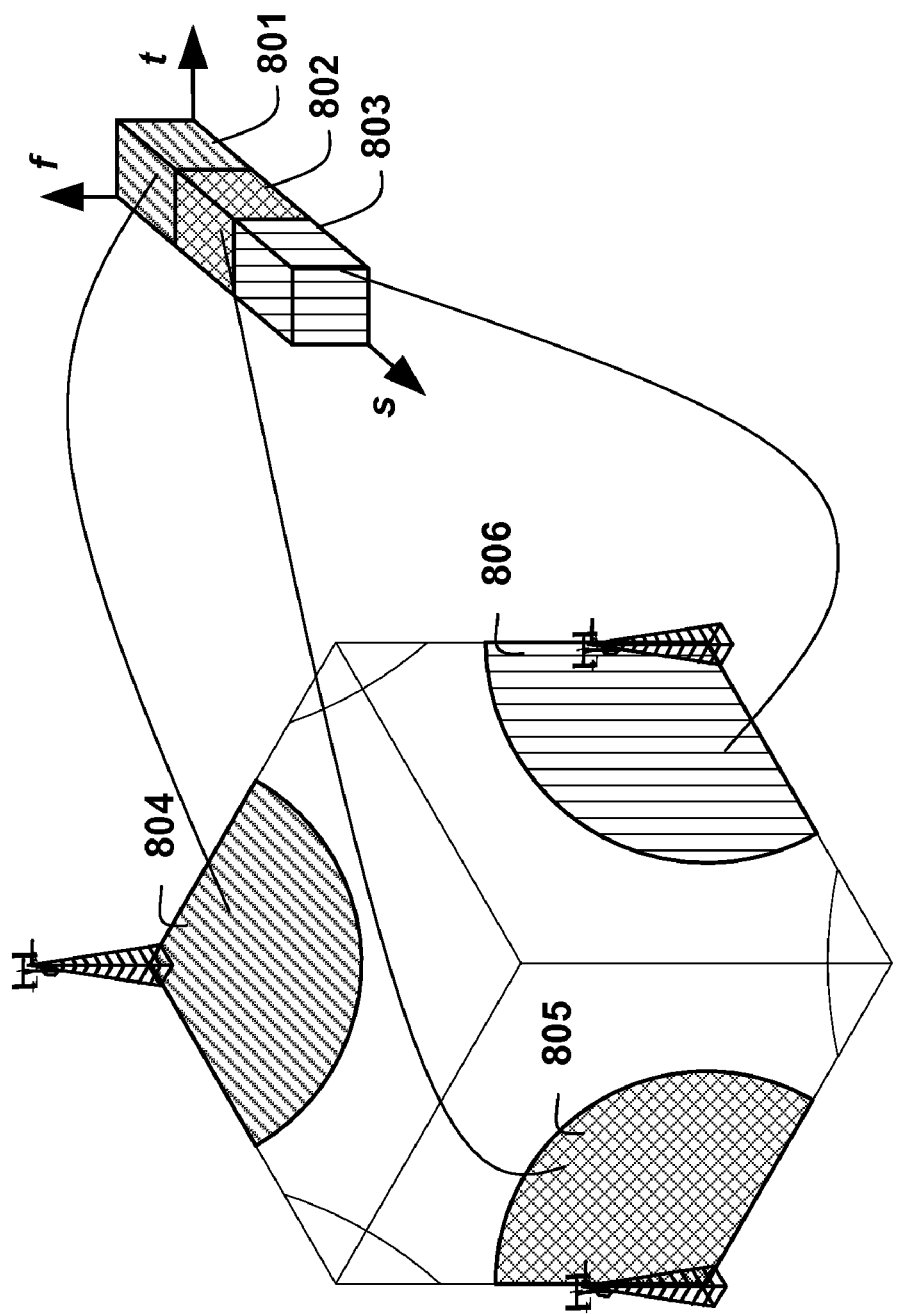
FIG. 7 is a schematic of resource block allocation for the cell center zone according to the embodiments of the invention.

FIG. 7 shows the resource cuboid allocation for the cell center zones in the cluster. When considering the $k^{th}$ resource cuboid, if the minimum ρ mobile station is located in the cell center zone, each of the resource cubes in the cuboid can be allocated to the mobile station in the corresponding cell center zone.

For example, resource cube 701 is allocated to the mobile station in cell center zone 704. Then, the scheduler determines the minimum ρ mobile station from all mobile stations in the cell center zone 705 to allocate the resource cube 702. Similarly, the scheduler determines the minimum ρ mobile station from all mobile stations in the cell center zone 706 to allocate the resource cube 703. So, the three resource cubes can be reused by three different cell center zones to achieve a high spectrum efficiency. A resource cuboid can support up to three mobile stations in the different cell center zones.

Resource Allocation for Cell Edge Zone

Figure 8:
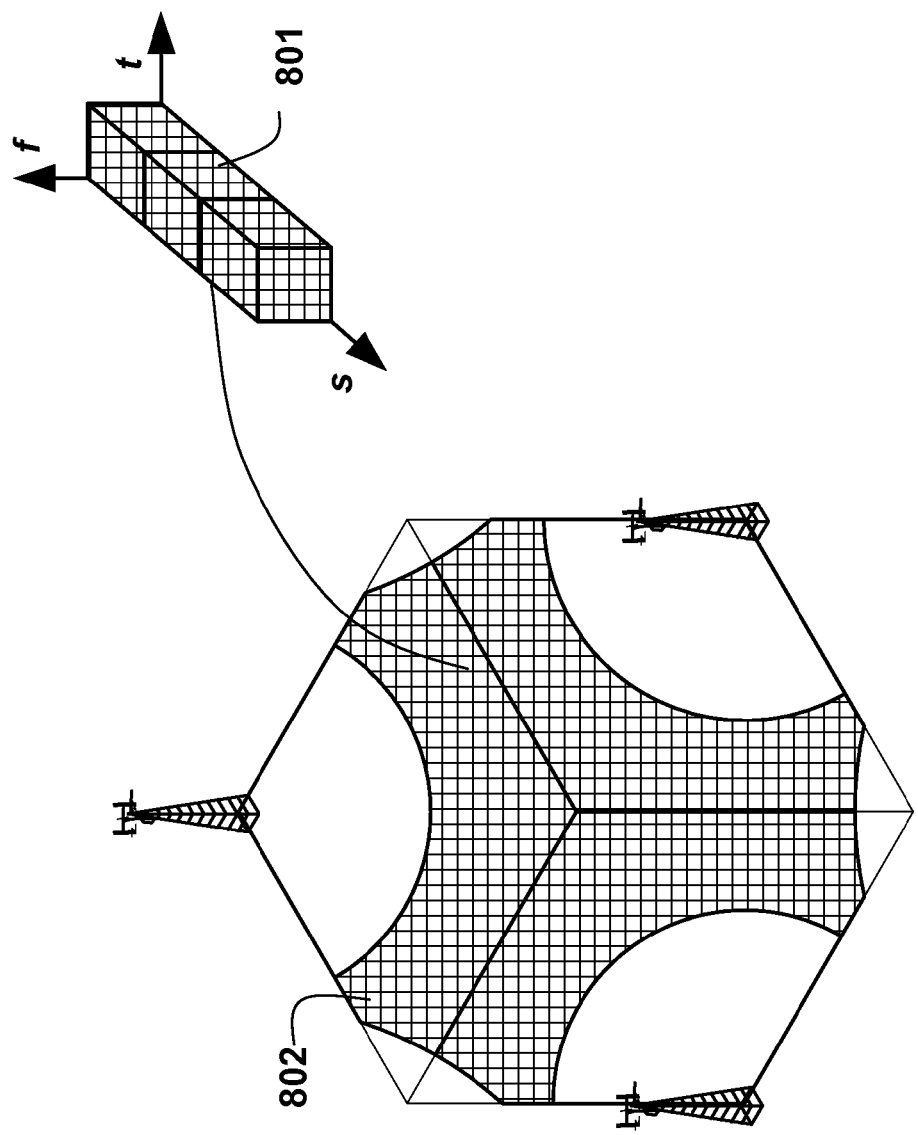
FIG. 8 is a schematic of resource block allocation for the cell edge zone according to the embodiments of the invention.

FIG. 8 shows the resource cuboid allocation for the cell edge zones. For the $k^{th}$ resource cuboid, if the minimum ρ mobile station is located in the cell edge zone, the mobile station is allocated the corresponding resource cube, but the rest resource cubes in the resource cuboid are prevented from using the resource. This is to reduce the inter-cell interference. Resource cube 801 is used by the mobile station in the cell edge zone 802. The remaining two resource cubes are also occupied by the same mobile station, logically. So, different to the resource allocation for the cell center zone, the allocation of a mobile station at the cell edge zone takes three resource cubes.

Resource Allocation for Cluster Corner Zone

Figure 9:
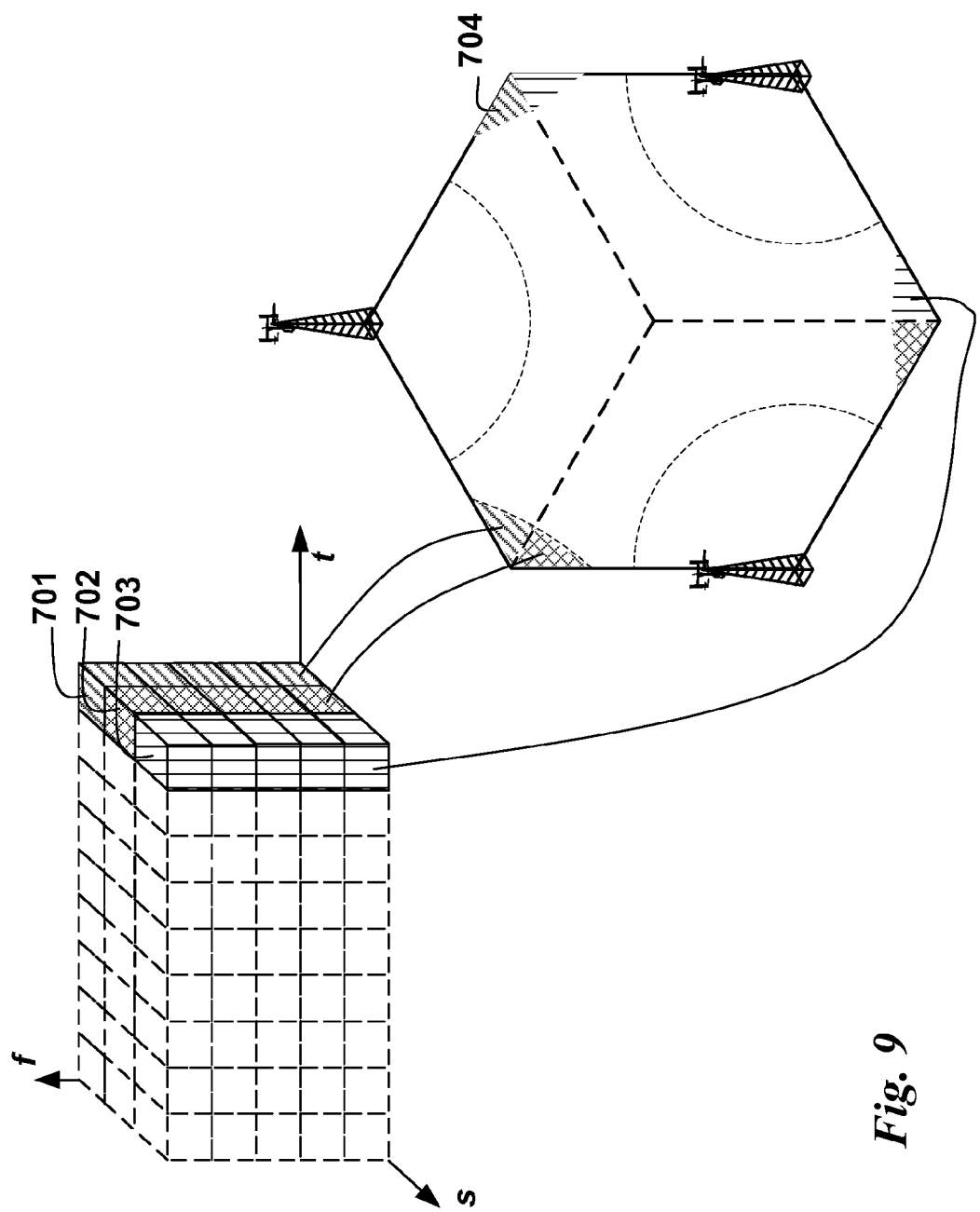
FIG. 9 is a schematic of resource block allocation for the cluster corner zone according to the embodiments of the invention.

FIG. 9 shows the fractional resource block reuse for the cluster corner zones. The resource blocks used for the corner zones are pre-planed for reuse at different clusters. For example, resource cuboid 901 is used by the base station for the cluster corner zones. This cuboid is not used by other base station in the same cluster, and it is reused by the base station having the reuse distance for its cluster corner zone. So, pre-planed resource blocks 901, 902, and 903 are used by the corresponding base station.

After performing the resource allocation, the allocation information is sent to the corresponding base station via the backhaul network. Base station performs the downlink transmission at corresponding carriers and symbols according to the scheduling. The corresponding transmit power is according to the zones of mobile stations, and the data rate are determined by the obtained channel state information.

It is to be understood that various other applications and modifications can be made within the spirit and scope of the invention. Therefore, it is the object of the appended claims to cover all such variations and modifications as come within the true spirit and scope of the invention.

We claim:

1. A method for allocating resource blocks in an orthogonal frequency-division multiple access network, including a set of base stations and a set of mobile stations served by each base station in a cell, and each cell is partitioned into a set of sectors, and each cell includes a center zone, an edge zone and a corner zone, comprises the steps of:
    forming clusters from the sectors, wherein each cluster includes adjacent sectors from different neighboring cells;
    acquiring channel state information collection for each cluster in one of the base stations associated with the cluster; and
    allocating resources for each mobile stations in each cluster according to whether the mobile station is the center zone, the edge zone or the corner zone of the cell, and wherein the allocating uses the channel state information for the cluster, wherein the allocating uses proportional fair scheduling to provide similar transmit data rates for the mobile stations and wherein the proportional fair scheduling for each mobile station u is $$\rho_u = \frac{mr_u}{R_u},$$

where m is a number of resource blocks allocated to the mobile station u in a current frame, $r_u$ is a data rate is used according to the channel state information, and $R_u$ is the data rate of a previous frames.

2. The method of claim 1, wherein each cell has three sectors, and the cluster can have one, two or three sectors.

3. The method of claim 1, wherein a cluster head is assigned to each cluster, and the cluster head operates in one of the base stations associated with the sectors in the cluster.

4. The method of claim 1, wherein the clusters are formed whenever a number of base stations in the network changes.

5. The method of claim 3, wherein each mobile station senses the channel state information on a downlink from the base station, and reports the channel state information to the associated base station on an uplink, and the base stations in the cluster send the channel state information to the cluster head via a backhaul network.

6. The method of claim 1, wherein frames for the sectors in each cluster form a frame array having an associated three-dimensional resource block, wherein each resource is indexed by a triplet (f, t, s), where f denotes a subcarrier index, t denotes symbol index, and s denotes a sector index.

7. The method of claim 1, wherein the allocating uses fractional resource block reuse to reduce intra cell interference.

8. The method of claim 1, further comprising:
    maintaining a diversity set at the mobile station to determine the zone for the mobile station.

9. The method of claim 1, wherein a first power is allocated to mobile stations in the center zone, and a second power to the mobile stations in the edge zone and the corner zone, wherein the second power is greater than the first power.

* * * * *